Sept. 11, 1928.  1,683,847
O. C. ROOS
ELECTROMAGNETIC WAVE RECEIVING SYSTEM
Filed Oct. 6, 1921    10 Sheets-Sheet 1
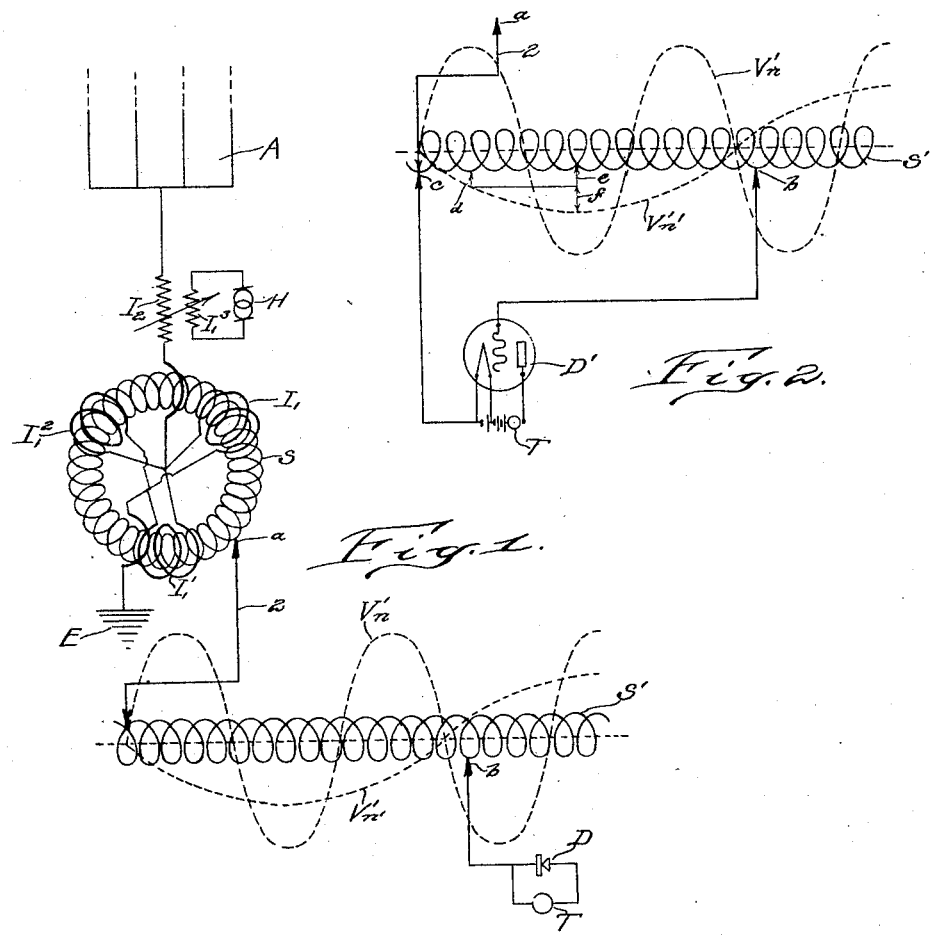
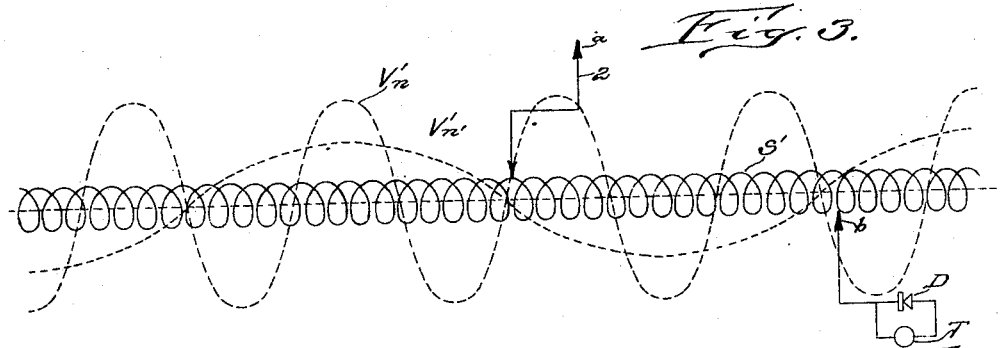
Inventor:
Oscar C. Roos
By Geo. K. Woodworth
Atty.

Sept. 11, 1928.  
O. C. ROOS  
1,683,847  
ELECTROMAGNETIC WAVE RECEIVING SYSTEM  
Filed Oct. 6, 1921 10 Sheets-Sheet 2
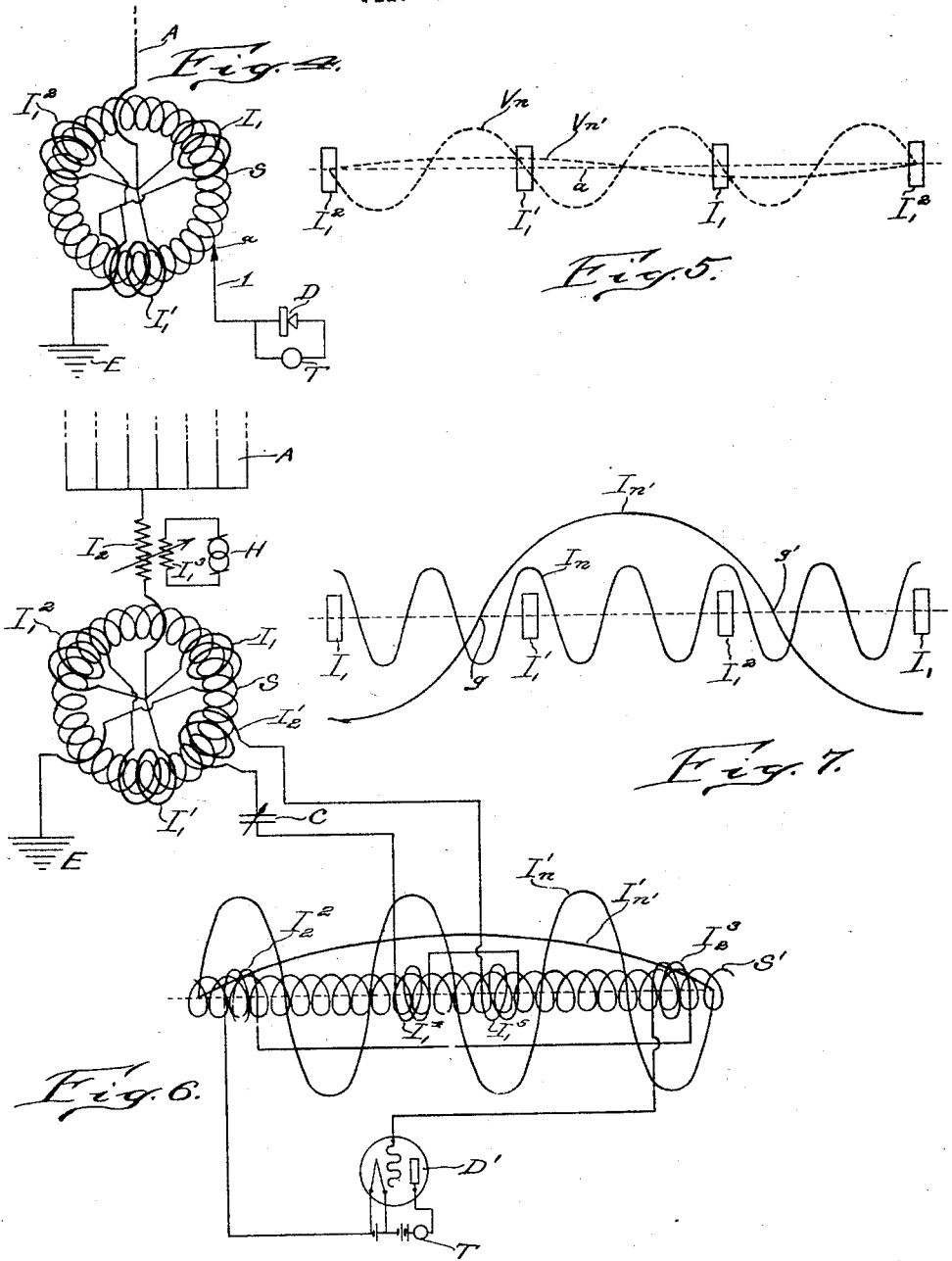

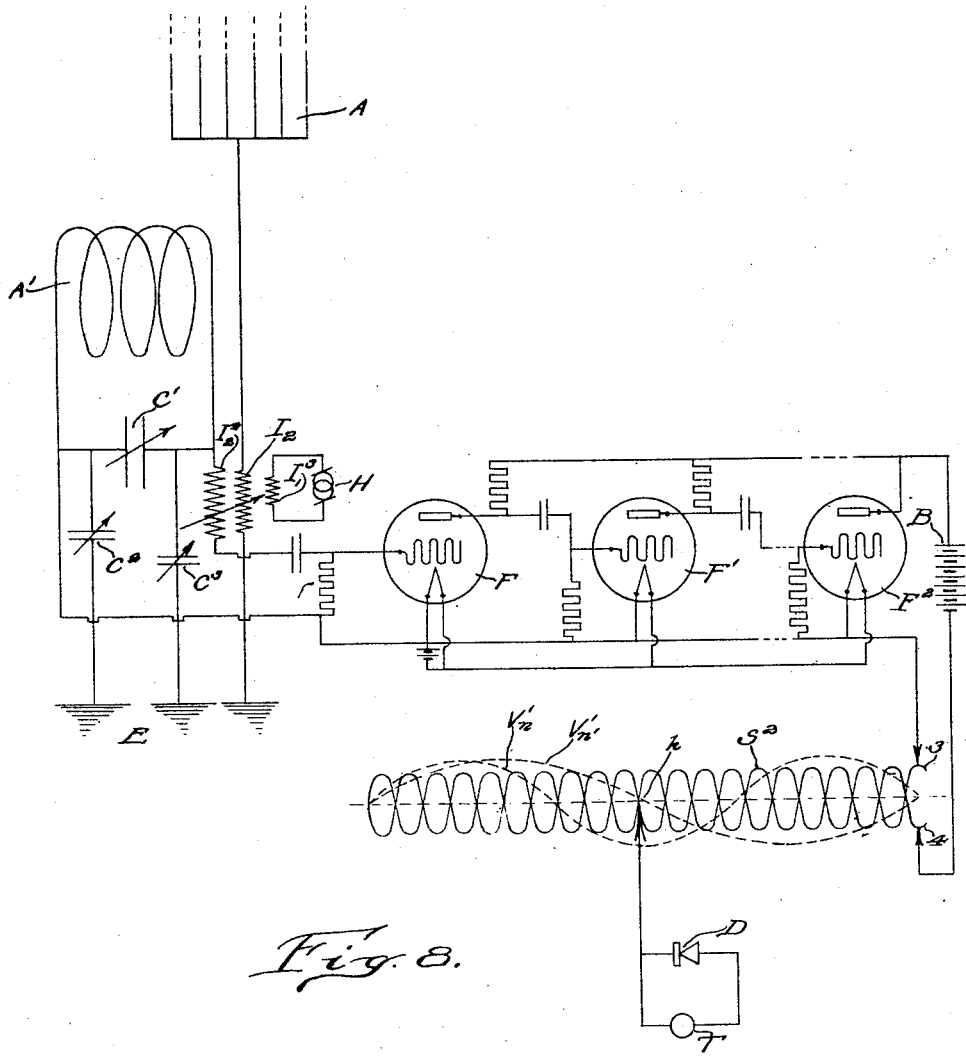

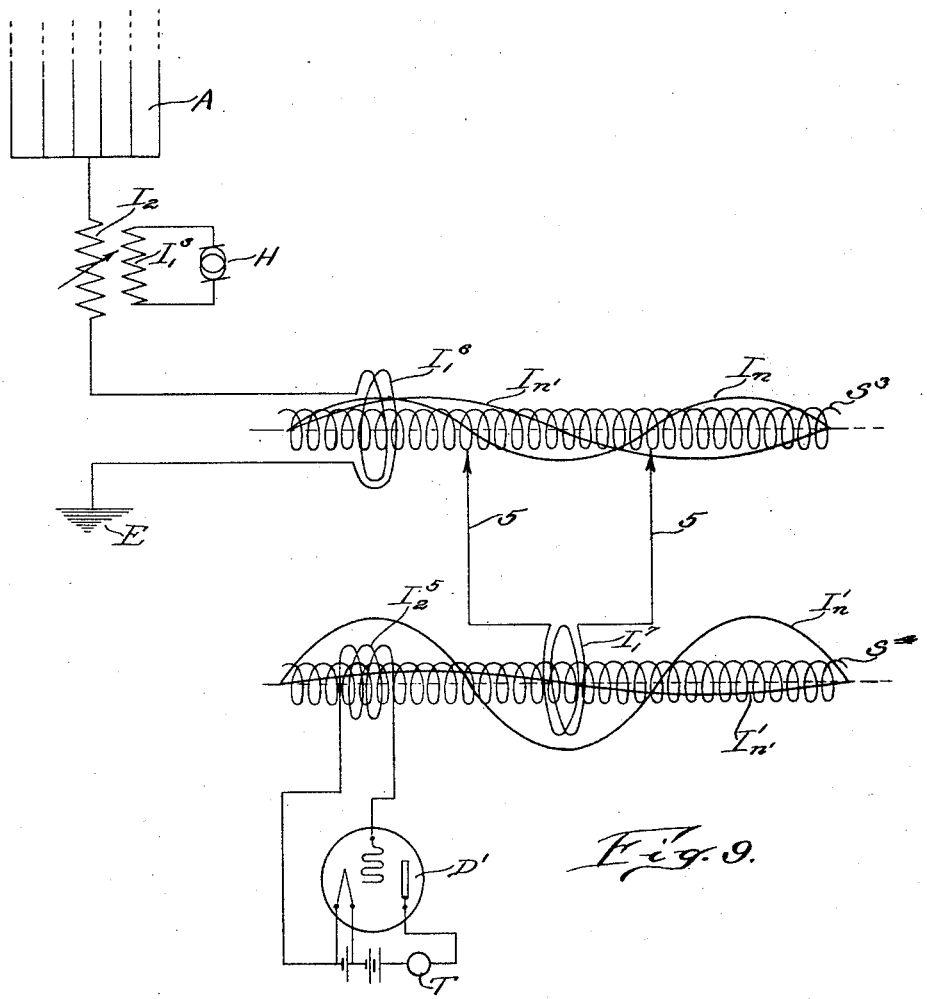

Sept. 11, 1928.

O. C. ROOS 1,683,847

ELECTROMAGNETIC WAVE RECEIVING SYSTEM

Filed Oct. 6, 1921  10 Sheets-Sheet 5

Inventor:
Oscar C. Roos

Sept. 11, 1928.

O. C. ROOS 1,683,847

ELECTROMAGNETIC WAVE RECEIVING SYSTEM

Filed Oct. 6, 1921    10 Sheets-Sheet 7

Inventor:
Oscar C. Roos
By Geo. K. Woodworth
Atty.

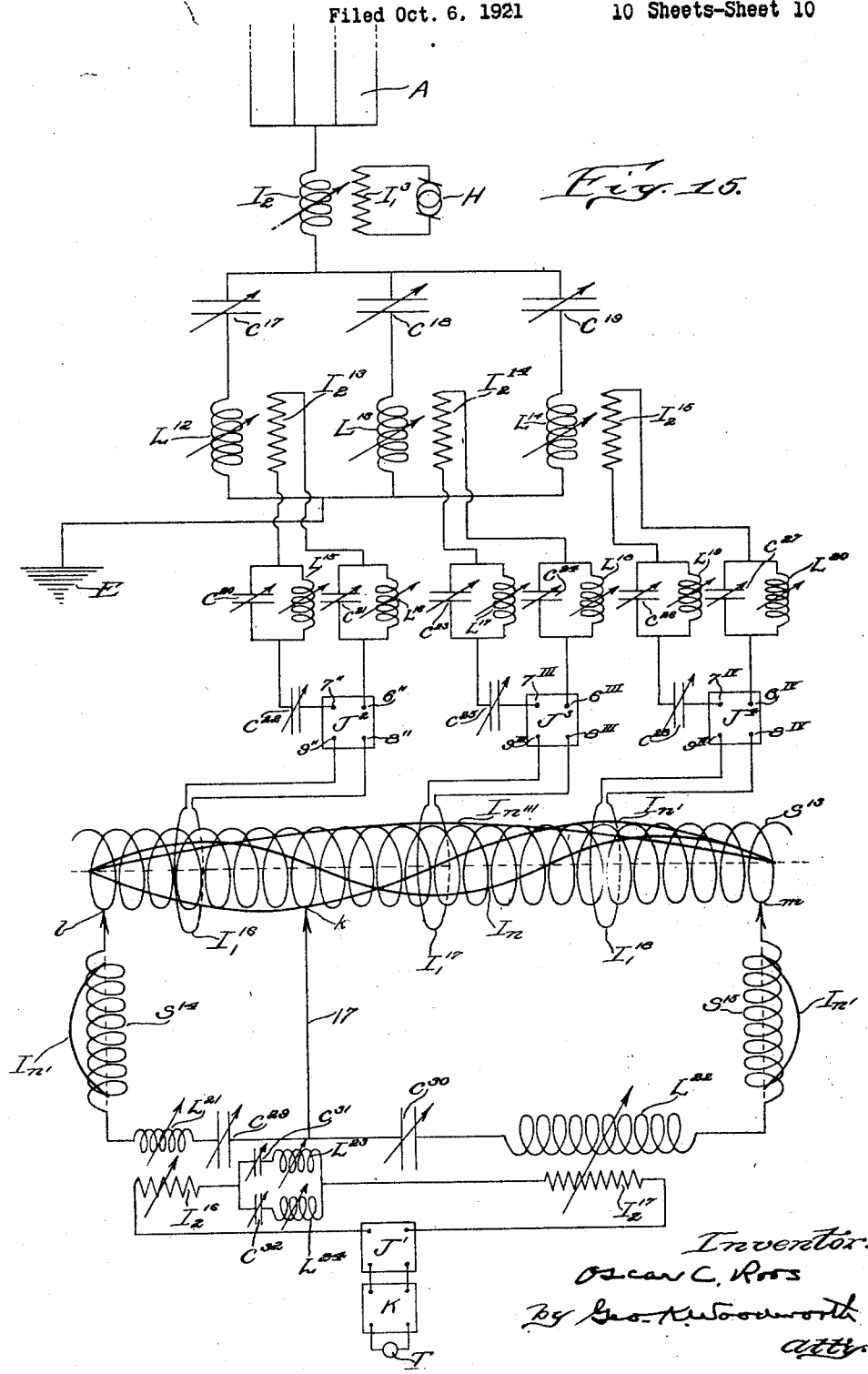

Patented Sept. 11, 1928.

1,683,847

UNITED STATES PATENT OFFICE.

OSCAR C. ROOS, OF ROCKLAND, MAINE.

ELECTROMAGNETIC WAVE RECEIVING SYSTEM.

Application filed October 6, 1921. Serial No. 505,785.

My invention relates to electromagnetic-wave receiving-systems and more especially to such systems whereby the effect on the oscillation detector of electrical vibrations created in the system by abrupt or impulsive electrical force, such for example as "static disturbances", so called, is eliminated or reduced to a minimum so that the signal-interference ratio is a maximum.

With this object in view my invention comprises as its salient features an electrical apparatus for converting abrupt or impulsive electrical forces into periodic vibrations of predetermined frequency, spatialized or not as the case may be, and an electrical apparatus for spatializing said periodic vibrations so resulting from such abrupt or impulsive electrical forces and for spatializing the electrical vibrations created in the receiving system by the electromagnetic waves the energy of which is to be received.

The first-mentioned apparatus may conveniently be referred to as a "reverberator" and the second as a "spatializer", although in special cases the reverberator may also be a spatializer. The reverberator may consist of any instrumentality such as a circuit, either closed or open, which is caused to vibrate periodically by abrupt or impulsive electrical forces. The spatializer may best consist of a slow-speed circuit, which, as is well understood, is a circuit having its electromagnetic constants continuously and uniformly distributed as in the case of an open or closed solenoid. The properties of such slow-speed circuits are well understood by those skilled in the art and need not be set forth at length herein, except to point out that such a circuit, in order to perform the function of a spatializer must be so designed as to permit the development therein of at least a quarter wave length of an electric wave.

In carrying out my invention I employ means for electrically associating either conductively or inductively, the spatializer with the reverberator, and other means for electrically associating either conductively or inductively, the oscillation detector with the spatializer.

My invention contemplates, in general, a conducting member so electrically associating the oscillation detector with the reverberator that the ratio of the amplitude therein of the vibrations to be received to the amplitude therein of the vibrations resulting from the abrupt or impulsive electrical forces is as large as may be, and in special cases where the reverberator also performs the functions of a spatializer, said member may be a simple conductor. Preferably the reverberator is designed to have its most pronounced natural rate of vibration, or if it is a spatializer as well as a reverberator, its fundamental natural period, different from that of the waves the energy of which is to be received, and the slow-speed circuit is designed to have its fundamental natural period or one of its harmonics equal to the most pronounced rate of vibration of the reverberator, and in the special cases aforesaid where the reverberator performs the functions of a spatializer the slow-speed circuit is designed to have its fundamental or one of its harmonics equal to the fundamental natural period or one of the harmonics of the reverberator, in general, one of the natural rates of vibration of said slow-speed circuit is made equal to one of the natural rates of vibration of said reverberator. As hereinafter more fully set forth, the reverberator, except in certain special cases, must have two degrees of freedom, or two natural rates of vibration, one of which is the frequency of the waves, the energy of which is to be received, and the other, which is its most pronounced natural rate of vibration, the frequency developed therein by abrupt or impulsive electrical forces. Where the reverberator performs the function also of a spatializer, it must in general have two degrees of freedom, as above set forth, and the spatializer must also have two degrees of freedom or two natural rates of vibration corresponding respectively to the two natural rates of the reverberator, one being the frequency of the waves the energy of which is to be received, and the other that of the vibrations developed therein by abrupt or impulsive electrical forces.

By spatializing the electrical vibrations developed in the system by abrupt or impulsive electrical forces and those resulting from the waves the energy of which is to be received, I am enabled to associate the oscillation detector with the spatializer at a point or points where the amplitude of the vibrations to be received is substantially larger than that of the vibrations resulting from the abrupt or impulsive electrical forces and thereby eliminate or reduce to a minimum the effect of the latter on said detector.

It will be obvious that the principle underlying my invention may be embodied in a multiplicity of apparatus and circuit arrangements, and therefore it will be understood that the several systems hereinafter particularly described are illustrative merely and not restrictive.

In the drawings accompanying and forming a part of this specification,—

Figure 1 is a diagram of an electromagnetic-wave receiving-system embodying a simple form of my invention wherein the reverberator performs the fuctions of a spatializer;

Figs. 2 and 3 are fragmentary diagrams showing modifications of the systems shown in Fig. 1;

Fig. 4 is a diagram of a further modification of the system shown in Fig. 1 wherein the member electrically associating the detector with the reverberator-spatializer is a simple conductor;

Fig. 5 is a curve drawn to rectangular co-ordinates showing the variation with space of the potential amplitude of the vibrations developed in the reverberator-spatializer of Figs. 1 and 4;

Fig. 6 is a diagram of a further modification of the system shown in Fig. 1 wherein the association of the spatializer with the reverberator and that of the detector with the spatializer are inductive;

Fig. 7 is a curve drawn to rectangular co-ordinates and showing the variation with space of the curent amplitude of the vibrations developed in the reverberator-spatializer of Fig. 6;

Fig. 8 is a diagram of a receiving system embodying my invention wherein the reverberator does not perform the functions of a spatializer;

Fig. 9 is a diagram of another modification of my invention in which the reverberator performs the functions of a spatializer;

Figure 11:
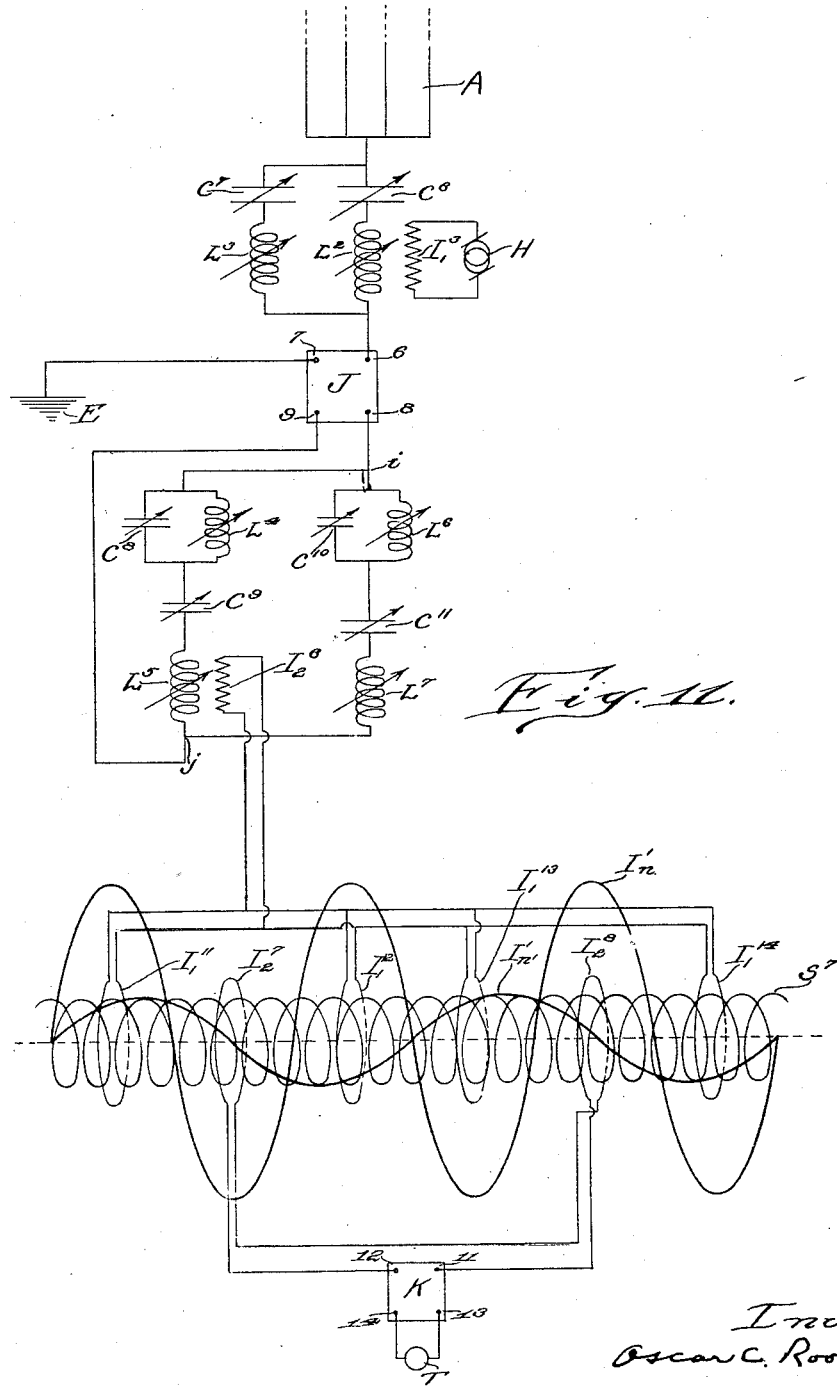
Figure 12:
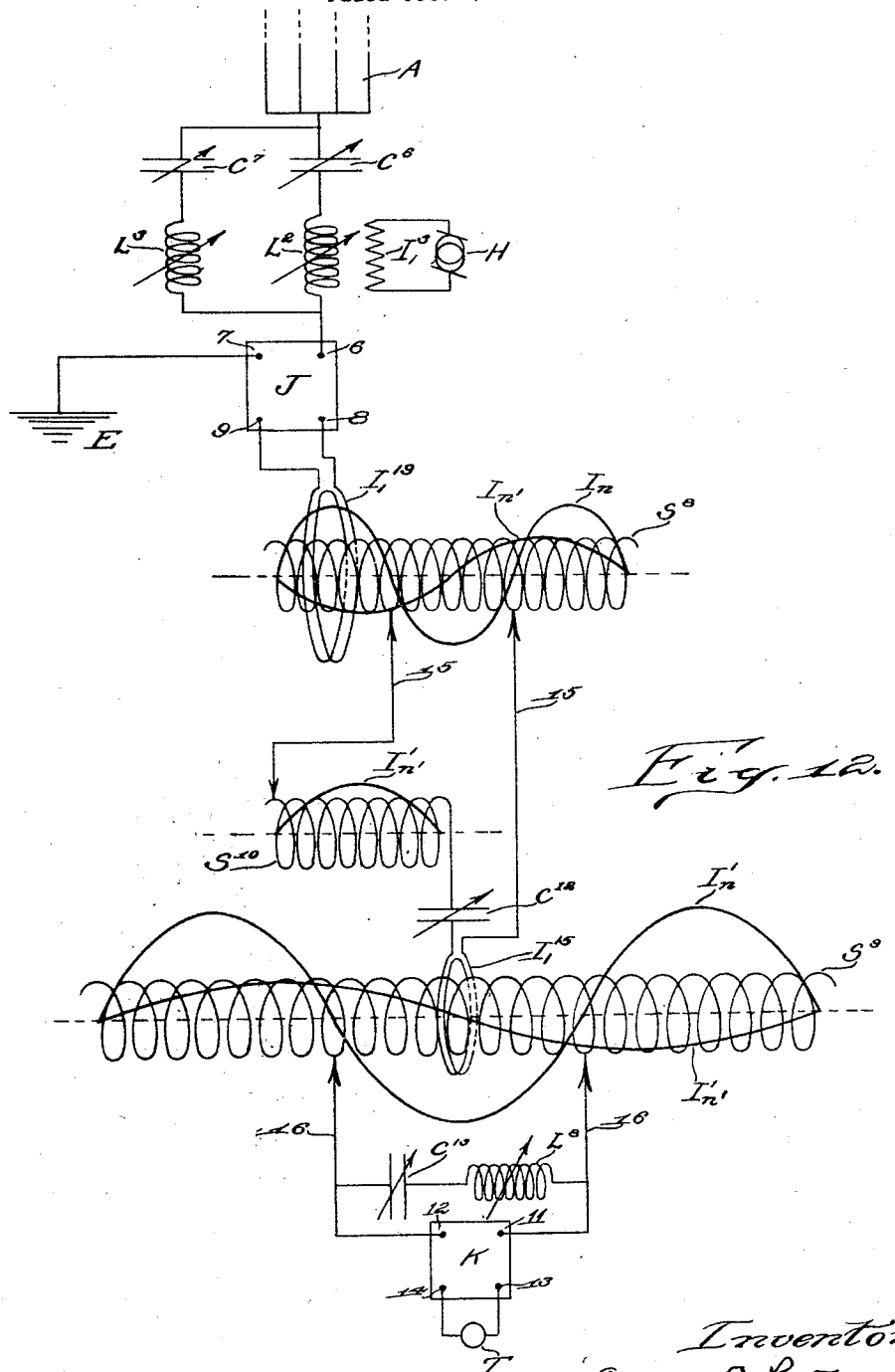
Figure 13:
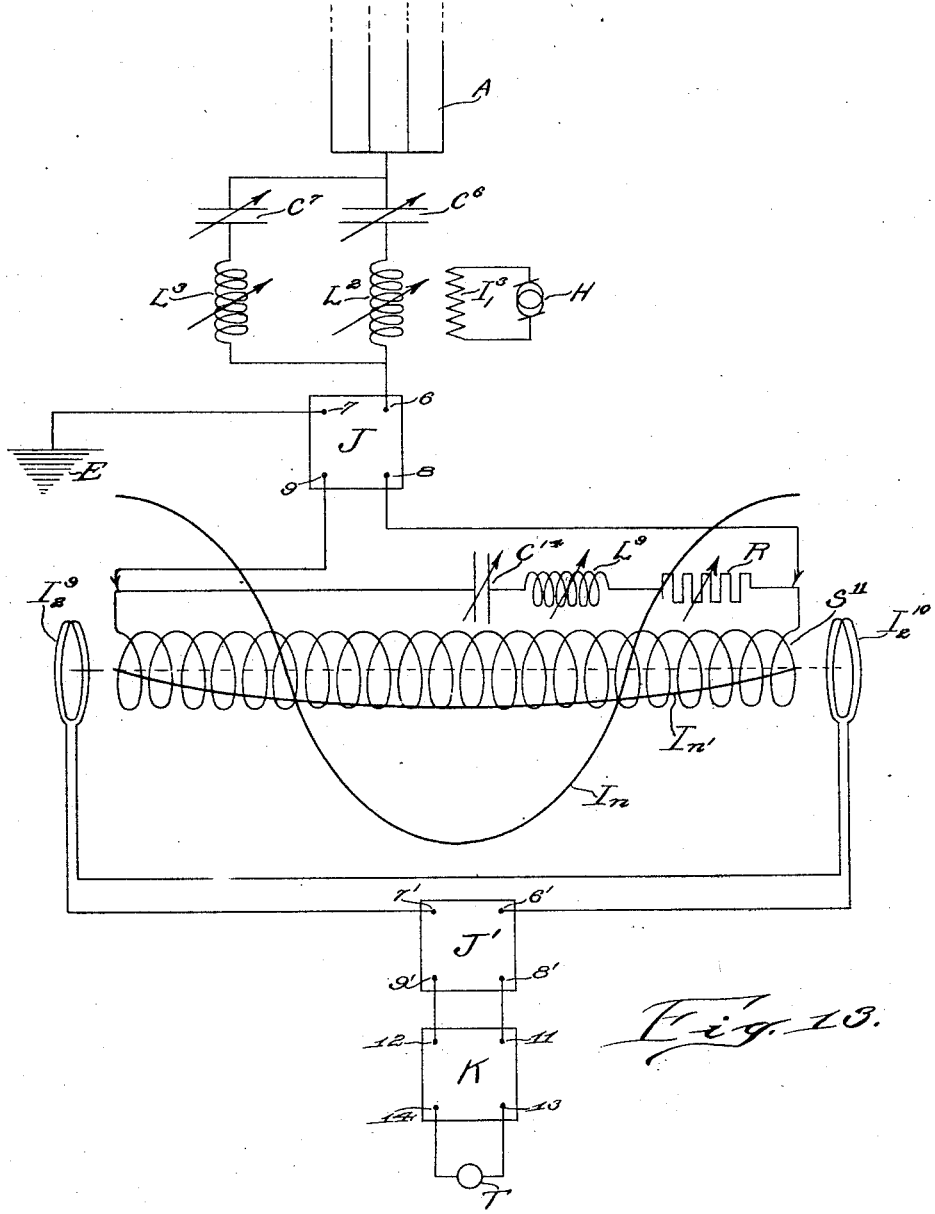
Figure 14:
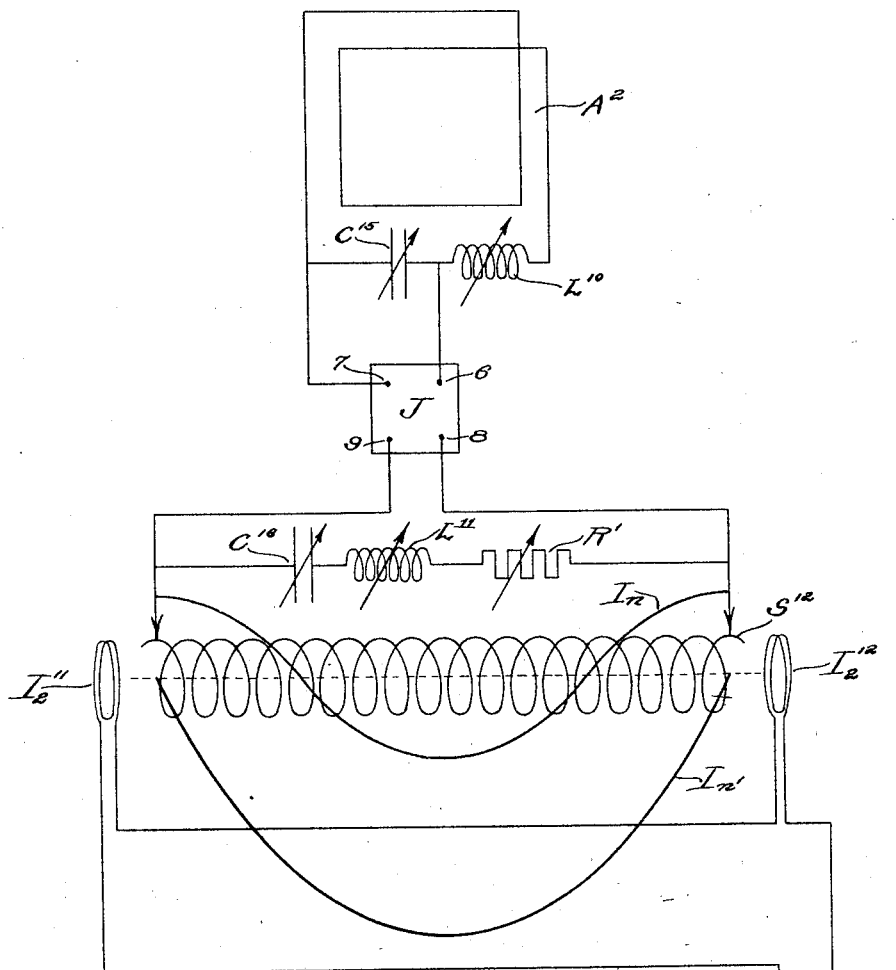

Figs. 10 to 15 inclusive are diagrams of complete receiving systems embodying the salient features of my invention as above set forth, each of said systems being provided with a radio-frequency amplifier interposed between the reverberator and the spatializer and an audio-frequency amplifier interposed between the spatializer and the signal indicating device, Figs. 13, 14 and 15, each showing a radio-frequency amplifier as well as an audio-frequency amplifier arranged between the spatializer and signal indicating device.

In the particular drawings selected for more fully disclosing the principle of my invention, A represents an aerial or elevated receiving conductor connected to earth at E, such connection in Figs. 1, 4 and 6 being through three primary exciting coils $I_1$, $I_1^1$, $I_1^2$ arranged in parallel and placed equidistantly around the slow-speed circuit S shown in the present instance as a closed solenoid the axis of the spires of which forms a circle. The primary exciting coils preferably are of the pancake type. If desired a heterodyne oscillator indicated in the present instance as a high frequency alternating current generator H may be associated with the antenna system, and such association is shown in the present instance as inductive, the heterodyne being connected to the primary $I_1^3$ of which the secondary $I_2$ is included in said antenna system.

The slow-speed circuit S, in this instance, has a plurality of degrees of freedom and its fundamental natural period $n'$ is different from the frequency $n$ of the waves the energy of which is to be received.

Referring to Fig. 5, the curve $Vn'$ represents the amplitude-space variaton of the potential of the vibrations developed in the slow-speed circuits of Figs. 1 and 4 by abrupt or impulsive electrical forces, the frequency $n'$ being the fundamental frequency natural to said circuit, and the curve $Vn$, the amplitude-space variation of the potential of the vibrations of frequency $n$ developed therein by the waves the energy of which is to be received. Inasmuch as the exciting coils are placed one hundred and twenty degrees apart on said slow-speed circuit it follows that the resultant of the amplitudes of the vibrations of frequency $n'$ developed in said circuit by abrupt or impulsive electrical forces theoretically would be zero, but as slight irregularities in the design and position of said coils would give a finite resultant, the curve $Vn'$ is shown as having a relatively small maximum ordinate.

In the particular instance represented in Fig. 5, the frequency $n$ of the waves to be received is equal to $3n'$ and as will be apparent from said curves an oscillation detector D, electrically connected with a signal indicating device T, may be electrically associated with said circuit at a point where the amplitude of the vibrations to be received is substantially larger than the amplitude of the vibrations resulting from said abrupt or impulsive electrical forces, and preferably at a point where the amplitude of the former is relatively large and that of the latter is practically zero. Such a point is shown at $a$ in Fig. 5.

The conducting member employed for so electrically associating said detector with the slow-speed circuit that the ratio of the amplitude therein of the vibrations to be received to the amplitude therein of the vibrations resulting from the abrupt or impulsive electrical forces is large,—in other words, for so electrically associating the two instrumentalities that the signal-interference ratio is a maximum,—may as indicated in Fig. 4 be a simple electrical conductor 1.

I prefer however to employ as such electrical associating means another slow-speed circuit S' as indicated in Fig. 1 whereby the electrical vibrations resulting from the abrupt or impulsive electrical forces and the vibrations resulting from the waves to be received will be spatialized therein. The said slow-speed circuit S' is designed to have its fundamental or one of its harmonics equal to the fundamental period $n'$ of the slow-speed circuit S or one of the harmonics of said fundamental. In the present instance the first odd harmonic of the slow-speed circuit S' is made equal to the fundamental of the slow-speed circuit S, and the curve V'$n'$ indicates the variation with space of the potential amplitude of the vibrations developed by the abrupt or impulsive electrical forces in the spatializer or slow-speed circuit S'. The variation with space of the potential amplitude developed in said spatializer S' by the vibrations to be received is shown by the curve V'$n$.

It will obvious that if an oscillation detector is associated with the spatializer S' at a point where the ordinate of the curve V'$n'$ is practically zero and the ordinate of the curve V'$n$ is practically a maximum, the effect of the vibrations resulting from the abrupt or impulsive electrical forces on said detector will be substantially zero, or at least a minimum, and the effect thereon of the vibrations to be received will be relatively large,—in other words, the signal-to-static ratio will be practically a maximum.

By taking the frequency of the vibrations to be received as a high odd-multiple of the fundamental of the slow-speed circuit S' it is possible to bring the maximum of the potential stationary-wave of said vibrations in said circuit close to the zero point of the potential stationary-wave of the vibrations in said circuit resulting from the abrupt or impulsive electrical forces. The effective radio-frequency of the vibrations to be received is under the control of the receiving operator when the hetrodyne is used. By the "effective radio-frequency" I do not mean the "beat tone" which is numerically equal to the difference between the frequency $n$ of the waves the energy of which is to be received and the frequency $n''$ of the vibrations produced by the heterodyne and which is an audio-frequency, but the arithmetric mean of said frequencies, which is, of course, a radio-frequency. It will be understood, without further explanation, that, when the heterodyne is employed, the frequency $n$, hereinbefore and hereinafter referred to as the frequency of the vibrations to be received or the frequency of the waves the energy of which is to be received, is the "effective radio-frequency", i. e., the frequency of said waves, or of the vibrations created by said waves as modified by said heterodyne, and that when the heterodyne is not used, said frequency $n$ is the frequency of said waves the energy of which is to be received, or of the vibrations created by said waves without modification by said heterodyne.

In the present instance said detector is conductively connected at the point $b$ with the slow-speed circuit S', although as hereinafter shown such association may be inductive. Any suitable means may be employed for electrically associating the slow-speed circuit S' with the reverberator-spatializer S at the point $a$ and in the present instance I have shown a conductor 2 conductively connecting the two, although as will be hereinafter explained, such association may be made inductively, or conductively and inductively.

It will be apparent from the foregoing that the apparatus indicated at S is a means for converting abrupt or impulsive and electrical forces into spatialized vibrations of predetermined frequency $n'$ and for spatializing the electrical vibrations of frequency $n$ created in the system by the electromagnetic waves the energy of which is to be received; that said apparatus has a plurality of degrees of freedom and a fundamental natural period $n'$ different from the frequency $n$ of said waves; that the apparatus indicated at S', designated generically as a slow-speed circuit, has one of its harmonics $n'$ equal to the fundamental $n$ of the apparatus S, although as will be obvious said harmonic might be equal to one of the even harmonics of the apparatus S, and that by virtue of the spatialization of the two sets of vibrations, the oscillation detector may be associated inductively or conductively with either of the apparatus S or S' at a point where the amplitude of the vibrations which are not to be received is substantially a node, and the amplitude of the vibrations which are to be received is substantially a loop.

The operations involved are in (1) shocking the slow-speed circuit S into stationary waves by abrupt or impulsive electrical forces, (2) associating an oscillation detector directly or indirectly with said slow-speed circuit at a node of said stationary waves, (3) adjusting the signal heterodyne so that the stationary waves developed in said slow-speed circuit by the electromagnetic waves the energy of which is to be received will have such an effective frequency that a loop will be formed at said nodal point; and, if the oscillation detector is associated with the slow-speed circuit S through the intermediary of the slow-speed circuit S', then (4) causing the relatively small amount of energy transmitted to the second slow-speed circuit S' from the standing wave created in the first slow-speed circuit S by said abrupt or impulsive electrical forces to form a standing wave in said second slow-speed circuit, (5) causing the relatively large amount of energy transmitted to the second slow-speed circuit from the standing wave created in the first slow-speed circuit by the electromagnetic waves the energy of which is to be received to form a standing wave in said second slow-speed circuit, and (6) associating an oscillation detector with said second slow-speed circuit at a point where the stationary-wave therein of the undesired vibrations is substantially a node and the stationary-wave therein of the desired vibrations is substantially a loop.

Preferably a plurality of primary exciting coils such as the three coils $I_1$, $I_1^1$, $I^2$, connected in parallel, are employed to reduce damping when communicating shocks to the slow-speed circuit S. As above pointed out the vector sum of the amplitudes of the natural oscillations developed in said slow-speed circuit by abrupt or impulsive electrical forces should be zero, for the reason that said oscillations are completely spatialized through a complete cycle starting at any point of the closed solenoid S and ending at the same point. This is the exact analogue in a circular spatial development of the usual theorem for balanced polyphase vectors which are developed as sinoidal magnitudes with time as the variable. This is not true of the vibrations developed therein by the waves to be received, because these vibrations are not completed when they have been developed around the complete circumference of the solenoid but reach this condition when they have been developed for only one-third of the circumferential length, and therefore the theorem of a combination of balanced polyphase vectors in space or time does not apply. The standing waves developed in the slow-speed circuit S can be made to reinforce each other at 120 geometrical degrees by suitably adjusting the heterodyne oscillator.

While the system is more efficient when the waves to be received are persistent, it is nevertheless operative when they are moderately damped so long as there is a sensible difference between the degree of effective damping thereof and that of the abrupt or impulsive electrical forces.

As shown in Fig. 2 the current-operated oscillation detector indicated in the present instance as the audion D' may be conductively connected to the slow-speed circuit S' at two points $b$, $c$, the standing wave $V'n'$ being zero at the point $c$ and substantially zero at the point $b$ and the curve $V'n$ being zero at the point $c$ and of considerable amplitude at the point $b$. As will be obvious said detector may be connected at other points to secure a maximum signal-interference ratio, for example, at the points $d$ and $e$ where the potential standing-wave developed by the vibrations to be received has maxima in opposite phases and the standing wave developed by the abrupt or impulsive electrical forces has a maximum at $e$ and a value less than said maximum but of the same sign at $d$ so that the effective voltage impressed on the detector is that which is represented by the line $f$.

As indicated in Fig. 3 the slow-speed circuit S may be connected to the slow-speed circuit S' at a point other than one at the end thereof for the purpose of rendering the signal-interference ratio as large as possible.

In Fig. 6 the slow-speed circuit S' is associated inductively with the slow-speed circuit S by means of the secondary $I_2'$ inductively related to said slow-speed circuit S and by the oppositely-connected primaries $I_1^4$ and $I_1^5$ inductively related to the slow-speed circuit S'.

Manifestly the association of the oscillation detector with the slow-speed circuit S' in this instance may be inductive or conductive, and I have represented the same as inductive, the opositely-connected secondaries $I_2^2$, $I_2^3$, which are serially connected with said oscillation detector, being inductively related to the slow-speed circuit S'.

An adjustable condenser C may be included in the circuit whereby the two slow-speed circuits are associated for tuning it to the frequency $n$.

Referring to Fig. 7 the curve $In'$ represents the amplitude-space variation of the current of the vibrations developed in the slow-speed circuit S of Fig. 6 by abrupt or impulsive electrical forces, the frequency $n'$ being the fundamental natural frequency of said circuit, and the curve $I_n$ represents the amplitude-space variation of the current of the vibrations developed in said slow-speed circuit by the waves the energy of which is to be received, in this particular instance $n$ being equal to $6n'$. Inasmuch as the current standing-wave is zero at two points, $g$, $g'$, the secondary $I_2'$ may be inductively related to the slow-speed circuit S at either of said points. The slow-speed circuit S' is designed to have its fundamental or one of its harmonics equal to the fundamental $n'$ of the slow-speed circuit S or one of the harmonics of said fundamental. In the present instance the fundamental of the slow-speed circuit S' is made equal to the fundamental $n'$ of the slow-speed circuit S and the curve $I'n'$ represents the variation with space of the current amplitude of the vibrations developed by abrupt or impulsive electrical forces in said slow-speed circuit S'. The amplitude-space variation of the current developed in said slow-speed circuit S' by the waves the energy of which is to be received is represented by the curve $I'n$, the primaries $I_1^4$ and $I_1^5$ being oppositely connected and so located with respect to the slow-speed circuit $S'$ that current maxima of opposite phases will be developed at their points of inductive association with said slow-speed circuit.

Having thus spatialized the two sets of vibrations in the slow-speed circuit $S'$, the oscillation detector $D'$ may be so associated with the latter that the signal-interference curve will be a maximum. In the present instance the secondaries $I_2^2$ and $I_2^3$ are placed around said slow-speed circuit at points where the curve $I'n$ has maxima which are opposite in phase, the said secondaries being wound in the same direction and reversely connected, and where the ordinates of the curve $I'n'$ are small, and are equal and have the same sign. By this mode of connection it will be obvious that the effect of the abrupt and impulsive electrical forces on the oscillation detector is eliminated or reduced to a minimum.

In Figs. 8 to 15 inclusive, each of the means employed for converting abrupt or impulsive electrical forces into periodic vibrations of predetermined frequency preferably, but not necessarily, has a plurality of degrees of freedom except in the case of Fig. 14, and the most pronounced natural rate of vibration of each is different from that of the waves the energy of which is to be received. In these embodiments of my invention the reverberator does not perform the functions of a spatializer, except in the case of Fig. 9, so that, although the use of a spatializer may be optional in the system shown in Figs. 1, 2, 3 and 6, as indicated in Fig. 4, the employment of such spatializer in the systems represented in Figs. 8 and 10 to 15, inclusive, is essential.

In Fig. 8 a receiving loop $A'$ of any suitable type is inductively associated with the antenna $A$ by the coils $I_2$, $I_2^4$, the former acting as a primary with respect to the latter and as a secondary with respect to the coil $I_1^3$ in the heterodyne circuit. Connected across the terminals of the loop antenna is a condenser $C'$, and balancing condensers $C^2$ $C^3$ are connected between the terminals of said condenser and the earth $E$.

The vibrations developed in the receiving system by the waves to be received, as well as the periodic vibrations of predetermined frequency created by abrupt or impulsive electrical forces in the loop antenna circuit $A'$ $C'$, the latter responding to at least two frequencies, the most pronounced of which is different from that of the waves to be received, are amplified by any suitable radio-frequency amplifier such as indicated at $F$, $F'$, $F^2$, which amplifier includes the battery $B$, and are then conducted to the slow-speed circuit or spatializer $S^2$.

In the present instance said spatializer consists of an open solenoid having two layers of windings which terminate at the points 3, 4. The spatializer is so designed that its fundamental natural period or one of its even harmonics is equal to the most pronounced natural rate of vibration $n'$, of the reverberator circuit $A'$ $C'$, and in the present instance it is shown as having its octave or first even harmonic equal to the most pronounced natural rate of vibration $n'$ of said reverberator, and its first odd harmonic or triple frequency equal to the frequency $n$ of the vibrations to be received.

The curve $V'n'$ represents the potential standing-wave formed in the spatializer by the periodic vibrations created in the reverberator by the abrupt or impulsive electrical forces, and the curve $V'n$ represents the potential standing-wave formed in said spatializer by the vibrations to be received. If the detector $D$ is associated with the spatializer at the point $h$ where the curve $V'n'$ crosses the zero axis and the curve $V'n$ has a maximum, the effect on the detector of the abrupt or impulsive electrical forces will be a minimum. Obviously said detector may be connected with the spatializer at other points to secure a fairly high signal-interference ratio.

It will be understood of course that the antenna system as a whole is attuned to the frequency of the waves the energy of which is to be received, and that the function of the heterodyne is the same as above set forth in connection with Fig. 1.

In Fig. 9 the antenna is inductively associated by the primary $I_1^6$ with the slow-speed circuit $S^3$ which acts as a reverberator and also as a spatializer and serves to convert the abrupt or impulsive electrical forces into spatialized vibrations of predetermined frequency $n'$ and also for spatializing the electrical vibrations of frequency $n$ created in the antenna system by the electromagnetic waves the energy of which is to be received.

The variation with space of the current amplitude developed in the slow-speed circuit $S$ by the undesired vibrations is indicated by the curve $In'$, $n'$ being the first even harmonic of said circuit, and the variation with space of the current amplitude developed in said circuit by the vibrations to be received is indicated by the curve $In$, $n$ being the first odd harmonic of said circuit.

While it will be obvious that the oscillation detector $D'$ may be associated directly with said slow-speed circuit $S^3$ so that the ratio of the amplitude therein of the vibrations to be received to the amplitude therein of the vibrations resulting from the abrupt or impulsive forces may be large, I prefer, as indicated, to translate the energy of the two sets of vibrations developed in said circuit $S^3$ to a second slow-speed circuit $S^4$, and in the present instance I have shown means for this purpose consisting of a conducting member 5 connected conductively with the circuit $S^3$ and inductively with the circuit $S^4$, although from what has preceded it will be understood that the association of the two slow-speed circuits may be entirely conductive or entirely inductive. As shown, the terminals of said conducting member 5 are connected to the slow-speed circuits $S^3$ at points where the current standing wave $In$ is zero, and where the corresponding potential standing-wave will have maxima opposite in phase, so that a large amount of the energy of the vibrations of frequency $n$ will be conveyed to the primary winding $I_1^7$ placed around the slow-speed circuit $S^4$ midway between the ends thereof. At the points of connection of the conducting member 5 with the slow-speed circuit $S^3$ the potential curve coresponding to the current curve $In'$ will have relatively small amplitudes of the same sign, and therefore but a small amount of the energy developed in the slow-speed circuit $S^3$ by the undesired vibrations will be conveyed to the primary $I_1^7$.

In the present instance the slow-speed circuit $S^4$ is shown as identical with the reverberator-spatializer $S^3$, and the current standing-waves developed therein by the desired and undesired vibrations, respectively, are shown by the curves $I'n$ and $I'n'$.

The oscillation detector D may be associated with the slow-speed circuit $S^4$ in a variety of ways to obtain a large signal-to-static ratio, and in the present instance I have shown the same connected inductively with said circuit by the secondary $I_2^5$ placed around said circuit at a point where the amplitude of the curve $I'n$ is a maximum and is larger than that of the curve $I'n'$. It is to be understood that the stationary-wave curves shown in the drawings are not intended to be relatively correct in amplitude.

Figure 10:
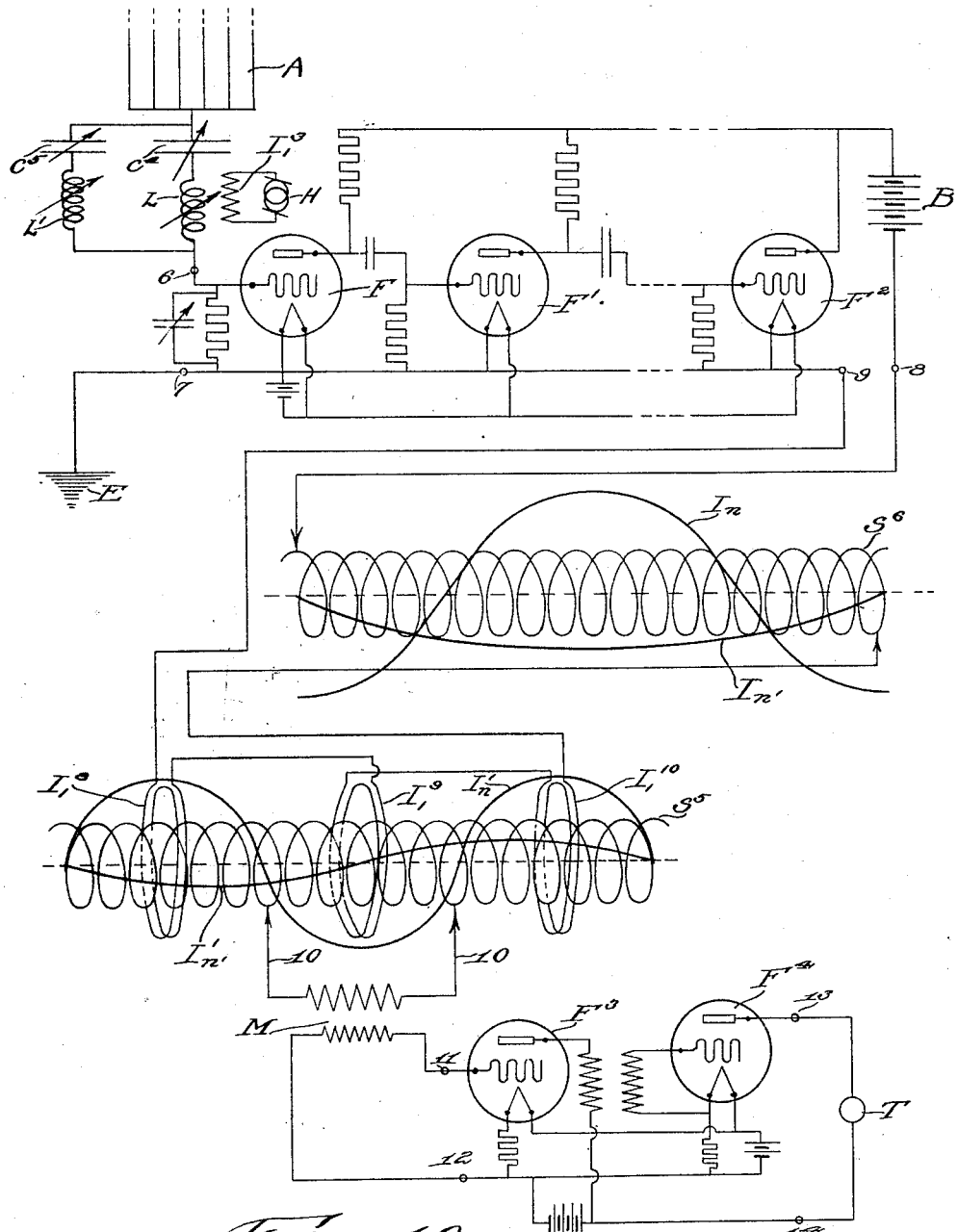

In the system illustrated in Fig. 10 the antenna is connected to earth through the parallel-branch circuit having the condenser $C^4$ and inductance L serially included in one branch and the condenser $C^5$ and inductance $L^1$ serially included in the other, the inductance L serving in this instance as the secondary for the primary $I_1^3$ of the heterodyne circuit.

The antenna system as a whole is attuned to the frequency $n$ of the waves to be received, and the parallel-branch circuit has, of course, a plurality of degrees of freedom, its most pronounced rate of vibration being the frequency $n'$. Abrupt or impulsive electrical forces will cause the parallel-branch circuit to develop vibrations of two frequencies, one of which, $n'$, has an amplitude much greater than the other, and the periodic vibrations of said frequency together with those created in the antenna system by the waves the energy of which is to be received are amplified by the radio-frequency amplifier F, F', $F^2$, the in-put terminals of which are shown at 6, 7 and the out-put terminals thereof at 8, 9. The said out-put terminals are connected to a circuit including the primaries $I_1^8$, $I_1^9$, $I_1^{10}$, which are inductively associated with the slow-speed circuit $S^5$, said primaries being wound in the same direction and the primary $I_1^9$ being oppositely connected. Included in said circuit is the slow-speed circuit $S^6$ which is designed to tend to vibrate at a half wave length when vibrations of said frequency $n'$ are impressed upon its terminals. Under this condition said slow-speed circuit $S^6$ acts as a rejector circuit for vibrations of frequencies $n'$, $3n'$, $5n'$, etc., having a very high impedance for vibrations of such frequencies, and is the equivalent of the usual rejector circuit consisting of two parallel branches, one of which, for the frequency to be rejected, has an equivalent capacity reactance and the other a numerically-equal equivalent inductance reactance. Such rejector slow-speed circuit will almost completely prevent the transmission of vibrations of said frequency $n'$ to the slow-speed circuit $S^5$, but will offer very little impedance to the passage therethrough of periodic vibrations of the frequency $n$. The curves $In$ and $In'$ represent the current stationary-waves developed in said circuit $S^6$ by the vibrations to be received and the undesired vibrations, respectively. The cure $I'n$ represents the current standing-wave developed in the slow-speed circuit $S^5$ by the vibrations of frequency $n$ which are to be received and $I'n'$ the current-standing wave of the undesired vibrations of frequency $n'$. The conducting member 10 is connected to said slow-speed circuit $S^5$ at two consecutive zero points of the curve $I'n$ where the corresponding potential curve has opposite maxima, as in the case of the conducting member 5 of Fig. 9. The audio-frequency amplifier indicated by $F^3$, $F^4$ and associated apparatus is connected with the conducting member 10 by the transformer M, the in-put terminals 11, 12 being connected to the secondary of said transformer and the out-put terminals 13, 14 thereof to the signal indicating device T. In the instance shown in the drawings the first even harmonic of the slow-speed circuit $S^5$ is equal to the most pronounced natural rate of vibration $n'$ of the reverberator parallel-branch circuit and its first odd harmonic is equal to the frequency $n$ of the vibrations to be received. In any case the maximum amplitude of the undesired vibrations in the slow-speed circuit $S^5$ will be very small as compared to that of the vibrations therein which are to be received, and the signal-interference ratio consequently is high.

In the system shown in Fig. 11 the antenna is connected to earth through the parallel-branch circuit having the condenser $C^6$ and inductance $L^2$ serially included in one branch and the condenser $C^7$ and inductance $L^3$ serially included in the other, the inductance $L^2$ serving in this instance as the secondary for the primary $I_1^3$ of the hetrodyne circuit. As in the case of Fig. 10 the antenna system as a whole is attuned to the frequency $n$ of the waves to be received and the parallel branch circuit has a plurality of degrees of freedom, its most pronounced rate of vibration being the frequency $n'$. Abrupt or impulsive electrical forces will cause the parallel-branch circuit to vibrate in two frequencies of which one is the frequency $n'$ as explained in connection with Fig. 10, and the periodic vibrations of said frequency together with those created in the antenna system by the waves the energy of which is to be received are amplified by the radio-frequency amplifier J, conventionally indicated, its in-put terminals being shown at 6, 7 and its out-put terminals at 8, 9.

Connected across the out-put terminals of the radio-frequency amplifier is a circuit including the parallel-branch circuit $C^8$ $L^4$, and the serially connected condenser $C^9$ and the inductance $L^5$. The said parallel-branch circuit $C^8$ $L^4$ is attuned to the frequency $n'$ of the vibrations developed in the parallel-branch reverberator circuit $C^7$ $L^3$ $C^6$ $L^2$ so that for said frequency the said parallel-branch circuit $C^8$ $L^4$ serves as a rejector circuit, and the condenser $C^9$ and inductance $L^5$ are so adjusted that the entire circuit connected as aforesaid across the out-put terminals 8 and 9 of said radio-frequency amplifier is attuned to the frequency $n$ of the waves to be received. Shunted across said circuit between the points $i$, $j$, is a circuit including the parallel-branch circuit $C^{10}$, $L^6$ and the serially connected condenser $C^{11}$ and inductance $L^7$. The parallel-branch circuit $C^{10}$ $L^6$ is attuned to the frequency $n$ of the waves to be received and therefore offers practically infinite impedance to the passage therethrough of vibrations of said frequency while the condenser $C^{11}$ and inductance $L^7$ are so adjusted that said shunt circuit connected as aforesaid between the points $i$, $j$, is attuned to the frequency $n'$ of the vibrations developed by abrupt or impulsive electrical forces in the reverberator. Inductively associated with the coil $L^5$ is the secondary $I_2^6$ to which is connected in parallel the four primaries $I_1^{11}$, $I_1^{12}$, $I_1^{13}$, $I_1^{14}$, said primaries being wound in the same direction and the primaries $I_1^{13}$, and $I_1^{14}$ being connected oppositely to the other two.

The curve $I'n$ represents the current stationary-wave formed in the slow-speed circuit $S^7$ by the vibrations of frequency $n$, and the curve $I'n'$, the current stationary-wave formed therein by the vibrations of frequency $n'$.

By virtue of the circuit arrangements above described the amplitude of the current stationary-wave formed in said slow-speed circuit $S^7$ by the undesired vibrations will be relatively small, a very small amount of the energy of said vibrations being transmitted to the secondary $I_2^6$. In the present instance said slow-speed circuits $S^7$ is designed to have its second even harmonic or quadruple frequency to the most pronounced rate of vibration $n'$ of the parallel-branch reverberator circuit, and the frequency $n$ of the vibrations to be received is equal to $3/2\ n'$.

The oscillation detector may be associated with said slow-speed circuit in any suitable manner to make the signal-interference ratio large, and in the present instance I have shown the same inductively associated therewith by the secondaries $I_2^7$, $I_2^8$, oppositely connected and placed around the slow-speed circuit at points where the curve $I'n$ has maxima opposite in phase and the curve $I'n'$ is zero. Preferably an audio-frequency amplifier K, conventionally indicated, of any suitable type is employed, the in-put terminals thereof being shown at 11, 12, and the signal indicating device T being connected to the out-put terminals 13, 14 thereof. It is to be understood, in connection with systems of the type shown in Figs. 10 and 11 that impulsive electrical forces will, in general, develop as many frequencies of vibration in the reverberator circuit as said circuit has degrees of freedom, and that such frequencies are the same for all classes of impulses. The effective amplitudes of the damped vibrations will, however, be inversely proportional approximately to the stiffness of said reverberator circuit. While some vibrations of the frequency $n'$ due to impulsive excitation may be created in the reverberator circuit by the signal waves of frequency $n$, the energy of the same will be small as compared to the energy absorbed by said circuit when excited by persistent trains of signal waves of said frequency $n$, viz, the waves the energy of which is to be received.

In the system shown in Fig. 12, the parallel-branch reverberator circuit and associated apparatus is the same as that above described in connection with Fig. 11. The out-put terminals 8 and 9 of the radio-frequency amplifier J are connected to the primary $I_1^{19}$ which is inductively associated with the slow-speed circuit $S^8$ and the curves $In$ and $In'$, respectively, represent the current stationary-waves developed in said slow-speed circuit by the vibrations to be received and by the undesired vibrations. At consecutive points where the curve I$n$ crosses the zero axis and where the corresponding potential curve has maxima opposite in phase, the potential curve corresponding to the curve I$n'$ having at said points relatively small amplitudes which are equal and of the same sign, the terminals of the conducting member 15 are connected, with the result already set forth in connection with Fig. 9. In the present instance said conducting member includes the primary I$_1^{15}$ inductively related to the slow-speed circuit S$^9$ midway between the ends thereof, the condenser C$^{12}$ and the rejector slow-speed circuit S$^{10}$ which performs the same function in this system as the rejector slow-speed circuit S$^6$ described in connection with Fig. 10, viz, that of strongly opposing the passage therethrough of vibrations of the frequency $n'$ developed in the reverberator parallel-branch circuit C$^7$ L$^3$ C$^6$ L$^2$. The circuit formed by the conducting member 15 and that portion of the slow-speed circuit S$^8$ which is included between the terminals thereof is attuned by the condenser C$^{12}$ to the frequency $n$ of the vibrations to be received.

The curve I'$n$ respresents the current standing-wave formed in the slow-speed conductor S$^9$ by the vibrations to be received and the curve I'$n'$, the current standing-wave formed therein by the undesired vibrations. The oscillation detector is conductively connected in this instance with the slow-speed circuit S$^9$ at such points as will render the signal-interference ratio large, as hereinbefore pointed out, an audio-frequency amplifier K, such as described in connection with Fig. 10, preferably being used. Shunted across the in-put terminals 11 and 12 of said audio-frequency amplifier, if the latter be employed, or in any event across the terminals of the conducting member 16 whereby the oscillation detector is associated with the slow-speed circuit, is a circuit including the serially connected condenser C$^{13}$ and inductance L$^8$, said circuit being attuned to the frequency $n'$ of the undesired vibrations.

In the system shown in Fig. 13 the same parallel-branch reverberator circuit and associated apparatus are employed as above described in connection with Figs. 11 and 12. Connected to the out-put terminals of the radio-frequency amplifier J is a rejector slow-speed circuit S$^{11}$, which, vibrating at the half wave length for vibrations of frequency $n'$ created by abrupt or impulsive electrical forces in the parallel-branch reverberator circuit, develops an enormously high impedance as above pointed out in connection with the rejector slow-speed circuits S$^6$ and S$^{10}$ described in connection with Figs. 10 and 12, respectively. Connected across the terminals of said slow-speed circuit is a shunt absorbing circuit including the serially connected condenser C$^{14}$, inductance L$^9$ and resistance R, said circuit being attuned to the frequency $n'$ and thereby still further reducing the amplitude of the current-standing-wave I$n'$ formed in the slow-speed circuit S$^{11}$ by the vibrations which are not to be received. The oscillation detector in this instance is associated inductively with said slow-speed circuit by the secondaries I$_2^9$, I$_2^{10}$ which are placed around the slow-speed circuit at points where the amplitude of the vibrations to be received is a maximum and the amplitude of the undesired vibrations $n'$ is substantially zero. For convenience of illustration said secondaries are shown slightly removed from the ends of the slow-speed circuit. Preferably said secondaries are serially connected with the in-put terminals 6', 7' of a radio-frequency amplifier J', and the out-put terminals 8', 9' of the latter are connected to the in-put terminals 11 and 12 of an audio-frequency amplifier K, such as shown in detail in Fig. 10. In this connection it is to be understood that I consider the use of radio-frequency or audio-frequency amplifiers wherever desired as within the scope of my invention.

In Fig. 14 I have shown a system having a loop antenna A$^2$ included in series with which are the condenser C$^{15}$ and inductance L$^{10}$, the said antenna system being designed to have practically a single degree of freedom and being attuned to a predetermined frequency $n'$. The antenna system is connected to the in-put terminals of the radio-frequency amplifier J and the out-put terminals of the latter are conductively connected to the slow-speed circuit S$^{12}$ which is designed to have its fundamental equal to said frequency $n'$ to which the antenna system is attuned, although, from what has preceded, it will be understood of course that said slow-speed circuit may be so constructed that one of its harmonics is equal to said frequency $n'$.

Connected across the terminals of the circuit which associates the radio-frequency amplifier with the slow-speed circuit is a circuit including the serially connected condenser C$^{16}$, inductance L$^{11}$ and resistance R', said circuit being attuned to the frequency $n'$ aforesaid.

Abrupt or impulsive electrical forces will cause the antenna system to vibrate at frequency $n'$ and therefore said system constitutes a means for converting abrupt or impulsive electrical forces into periodic vibrations of predetermined frequency. Such vibrations are amplified by the apparatus J and are conveyed to the slow-speed circuit where they are spatialized, the curve I$n'$ representing the current stationary-wave formed in said slow-speed circuit by vibrations of frequency $n'$. Inasmuch as the slow-speed circuit vibrates at the half-wave length for vibrations of frequency $n'$, it acts as a rejector circuit for vibrations of said frequency, as explained above in connection with the slow-speed circuits $S^6$, $S^{10}$ and $S^{11}$ of Figs. 10, 12 and 13, respectively, and thereby reduces the amplitude of the vibrations of said frequency developed therein. The circuit $C^{16}$, $L^{11}$, $R'$, attuned to said frequency $n'$, serves as a resonant absorbing shunt for vibrations of said frequency and thereby still further reduces the amplitude of said vibrations in said slow-speed circuit. In the present instance the waves the energy of which is to be received have the frequency $n$ which is equal to $2n'$ and therefore the response of the antenna system to waves of said frequency will be relatively feeble.

The vibrations developed in the receiving system by said waves of frequency $n$ are amplified by the apparatus J and conveyed to the slow-speed circuit where they are spatialized, the curve I$n$ representing the current stationary-wave formed in the slow-speed circuit by said vibrations.

At points where the curve I$n'$ crosses the zero axis and the curve I$n$ has maxima of same sign, the oscillation detector is associated with the slow-speed circuit, the associating means represented in the present case being the secondaries $I_2^{11}$, $I_2^{12}$, which for convenience are shown as slightly removed from the ends of the slow-speed circuit, as in Fig. 13, although it will be understood that they surround said circuit at the points above indicated. By virtue of such association it will be readily apparent that the energy translated to the circuit of said secondaries by vibrations of frequency $n$ will be very much larger than that translated thereto by vibrations of the frequency $n'$ and this in spite of the fact that the aerial system is actually detuned to twice the latter.

As in the system shown in Fig. 14, a radio-frequency amplifier J' and an audio-frequency amplifier K may be interposed between the signal-indicating device T and the secondaries $I_2^{11}$, $I_2^{12}$.

The system shown in Fig. 15 is designed especially for Yale-lock systems, so called in which the signal is transmitted by electromagnetic waves of two or more frequencies. The antenna A is connected to earth at E through a plurality of parallel circuits, at least two of which are stiff and are attuned to the frequencies of the signal waves and one of which is limber and is attuned to a different frequency, so that it will more readily be shocked into vibration by abrupt or impulsive electrical forces than the others, and as its rate of vibration is different from that of the others, it follows that the periodic vibrations created therein by abrupt or impulsive electrical forces will be different from the frequencies of the signal waves.

In the present instance I have shown two such stiff circuits each attuned to the frequency of one of the sets of waves to be received, although of course it will be understood that as many such circuits will be employed as there are sets of waves making up the signal.

In the particular arrangement shown in Fig. 15 for illustrating this special case of my invention the circuit including the condenser $C^{17}$ and inductance $L^{12}$ is stiff, i. e., its selectance function $$\left(\frac{L}{CR^2}\right)^{\frac{1}{2}}$$

is large and the effective amplitude therein of damped vibrations will be small, and it is attuned to the higher of the two frequencies of the waves to be received, which will be designated as the frequency $n$. The circuit which includes the condenser $C^{18}$ and inductance $L^{13}$ is stiff and is attuned to the lower of the two frequencies which make up the signal and which will be designated as $n'''$. The circuit including the condenser $C^{19}$ and inductance $L^{14}$ is limber i. e., it has a low selectance function, and is more readily shocked into vibration at its natural rate $n'$ by abrupt or impulsive electrical forces than the other two circuits connected in parallel therewith. The frequency $n'$ may be, and preferably is, taken as numerically intermediate the frequencies $n$ and $n'''$.

Obviously the three circuits above described will constitute a reverberator and by virtue of the adjustment of the respective electromagnetic constants thereof the amplitudes of vibrations having the frequencies $n$ and $n'''$ which may be developed therein by abrupt or impulsive electrical forces will be relatively small compared to the amplitude of vibrations of frequency $n'$ developed therein by such forces.

Associated inductively with said circuits by the secondaries $I_2^{13}$, $I_2^{14}$, $I_2^{15}$, respectively, are three circuits each associated with the slow-speed circuit $S^{13}$ through the intermediary of radio-frequency amplifiers $J^2$, $J^3$, $J^4$, respectively, which may with advantage be employed.

The first of said circuits includes the serially connected parallel-branch circuit $C^{20}$ $L^{15}$, $C^{21}$ $L^{16}$, the condenser $C^{22}$ and the input terminals $6''$ $7''$ of the radio-frequency amplifier $J^2$.

The parallel-branch circuit $C^{20}$ $L^{15}$ is attuned to the frequency $n'''$ which is that of the signal waves which have the lower frequency and therefore said parallel-branch circuit acts as a rejector circuit for vibrations of said frequency. The parallel-branch circuit $C^{21}$ $L^{16}$ is attuned to the frequency $n'$ which is that of the vibrations created in the reverberator by abrupt or impulsive electrical forces and as aforesaid is intermediate numerically the frequencies $n$ and $n'''$. For vibrations of said frequency $n'$ therefore, the said parallel-branch circuit $C^{21} L^{16}$ acts as a rejector circuit. By means of the condenser $C^{22}$ or by other suitable means the entire circuit which includes the secondary $I_2^{13}$ is attuned to the frequency $n$ which is that of the set of waves making up the signal which has the higher frequency.

The second circuit which includes the secondary $I_2^{14}$ contains the serially connected parallel-branch circuit $C^{23} L^{17}$, $C^{24} L^{18}$, the condenser $C^{25}$ and the in-put terminals $6'''$ $7'''$ of the radio-frequency amplifier $J^3$. The parallel-branch circuit $C^{23} L^{17}$ is attuned to the frequency $n'$ and is a rejector circuit for vibrations of said frequency. The parallel-branch circuits $C^{24} L^{18}$ is attuned to the frequency $n$ and is a rejector circuit for vibrations of said frequency. The circuit as a whole which includes the secondary $I_2^{14}$ is attuned by the condenser $C^{25}$ or by other suitable means to the frequency $n'''$ which is that of the set of waves making up the signal which has the lower frequency.

The third circuit includes the serially connected parallel-branch circuits $C^{26} L^{19}$, $C^{27} L^{20}$, the adjustable condenser $C^{28}$ and the in-put terminals $6^{iv} 7^{iv}$ of the radio-frequency amplifier $J^4$. The parallel-branch circuit $C^{26} L^{19}$ is attuned to the frequency $n$ and is a rejector circuit for vibrations of said frequency. The parallel-branch circuit $C^{27} L^{20}$ is attuned to the frequency $n'''$ and is a rejector circuit for vibrations of said frequency. The circuit as a whole which includes the secondary $I_2^{15}$ is attuned by the condenser $C^{28}$ or other suitable means to the frequency $n'$ which is that of the vibrations developed in the system by abrupt or impulsive electrical forces.

Primaries $I_1^{16} I_1^{17} I_1^{18}$ inductively related with the slow-speed circuit $S^{13}$ at suitable points are connected respectively with the out-put terminals $8''$ and $9''$, $8'''$ and $9'''$, and $8^{iv}$ and $9^{iv}$, of the radio-frequency amplifiers $J^2 J^3$ and $J^4$, respectively.

By virtue of the foregoing arrangement current stationary-waves of frequency $n$, $n'$ and $n'''$ are formed in the slow-speed circuit $S^{13}$, such stationary waves being represented by the curves $In$, $In'$ and $In'''$, respectively. Connected to the slow-speed circuit $S^{13}$ at consecutive points where the amplitude of the current standing-wave formed in said circuit by the undesired vibrations of frequency $n'$ is zero and where therefore the corresponding potential curve has maxima of the same phase and value, is a circuit including the slow-speed rejector circuits $S^{14}$, $S^{15}$, such as described in connection with Figs. 10, 12, 13 and 14, each vibrating at the half wave length for vibrations of the frequency $n'$. Said circuit includes also the serially connected condenser $C^{29}$, and inductance $L^{21}$ and the serially connected condenser $C^{30}$ and inductance $L^{22}$. A conductor 17 connects said circuit at a point between the condensers $C^{29}$, $C^{30}$ with the slow-speed circuit $S^{13}$. The constants of the circuit $S^{14} L^{21} C^{29}$ 17 and that portion of the slow-speed circuit $S^{13}$ included between the points $k$ and $l$ are so chosen that said circuit is made resonant to the frequency $n$. The circuit 17 $C^{30} L^{22} S^{15}$ and that portion of the slow-speed circuit $S^{13}$ included between the points $m$ and $k$ is made resonant to the frequency $n'''$.

It will be noted that at the points $l$ $k$ the current stationary-wave $In$ crosses the zero axis and that the corresponding potential standing-wave has maxima of opposite sign. Accordingly vibrations of said frequency $n$ will be developed in the circuit connected as aforesaid to the slow-speed circuit $S^{13}$ between the points $l$ and $k$. At the points $l$ and $k$ the potential standing-wave corresponding to the current standing-wave $In'''$ has finite values both of the same sign, but inasmuch as the circuit included between said points is made highly resonant to the frequency $n$, but feeble vibrations of said frequency $n'''$ will be developed therein. By virtue of the rejector slow-speed circuit $S^{14}$ the amplitude of the vibrations of frequency $n'$ in said circuit connected between the points $l$ and $k$ to the slow-speed circuit $S^{13}$ will be practically negligible.

In like manner it will be seen that vibrations of frequency $n'''$ of considerable amplitude will be developed in the circuit connected to the slow-speed circuit $S^{13}$ between the points $k$ and $m$ and that the amplitudes of vibrations in the portion $C^{30} L^{22} S^{15}$ thereof which have frequencies $n$ and $n'$ will be substantially negligible.

Inductively associated with the coils $L^{21}$ and $L^{22}$, respectively, are the secondaries $I_2^{16} I_2^{17}$ which are serially connected with the parallel-branch circuit $C^{31} L^{23}$, $C^{32} L^{24}$ and the in-put terminals of the radio-frequency amplifier $J'$. The parallel-branch circuit $C^{31} L^{23}$, $C^{32} L^{24}$ may be attuned to the frequency $n'$ of the undesired vibrations, and the circuit as a whole which includes said parallel branch circuit it attuned to the frequencies $n$ and $n'''$. An audio-frequency amplifier $K$ may be connected to the out-put terminals of the radio-frequency amplifier $J'$ if desired.

It will be apparent that by means of the system shown in Fig. 15 the effect on the oscillation detector of the vibrations created in the system by abrupt or impulsive electrical forces is minimized so that the signal-interference ratio is a maximum.

Each of the thirteen systems herein particularly described for the purpose of more fully disclosing my invention involves the application of my discovery that the vibrations created in a receiving system by abrupt or impulsive electrical forces may be spatialized in a suitable instrumentality and that by spatializing in the same instrumentality the vibrations to be received, the two sets of vibrations can be segregated. The best apparatus known to me at the present time for effecting such a spatialization and segregation of the two sets of vibrations is a slow-speed circuit, but it is to be understood that I do not limit my invention to the use of the same.

It will be obvious that the principle underlying my invention can be embodied in numerous forms of apparatus and circuit arrangements and therefore it is to be understood that my invention, as defined by the appended claims, is not to be limited to the particular forms of apparatus and circuit arrangements herein specifically described.

I claim:—

1. An electromagnetic-wave receiving system comprising in combination means for converting abrupt or impulsive electrical forces into persistent periodic vibrations of predetermined frequency, said means having its most pronounced natural rate of vibration different from that of the waves the energy of which is to be received. an oscillation detector, a slow-speed circuit having its electromagnetic constants continuously and uniformly distributed and being constructed and arranged to permit the development therein of standing waves without appreciable attenuation, said slow-speed circuit having one of its natural rates of vibration equal to one of the natural rates of vibration of said means, means electrically associating said slow-speed circuit with said means and means electrically associating said detector with said slow-speed circuit.

2. An electromagnetic-wave receiving system comprising in combination means for converting abrupt or impulsive electrical forces into spatialized vibrations of predetermined frequency and for spatializing electrical vibrations created in said system by the electromagnetic waves the energy of which is to be received, said means having a plurality of degrees of freedom and a fundamental natural period different from that of said waves, an oscillation detector, a slow-speed circuit having one of its natural rates of vibration equal to one of the natural rates of vibration of said means, means electrically associating said slow-speed circuit with said means and means electrically associating said detector with said slow-speed circuit.

3. An electromagnetic-wave receiving system comprising in combination means for converting abrupt or impulsive electrical forces into spatialized periodic vibrations of predetermined frequency and for spatializing electrical vibrations created in said system by the electromagnetic waves the energy of which is to be received, said means having a plurality of degrees of freedom and a fundamental natural period different from that of said waves, an oscillation detector, and a conducting member so electrically associating said detector with said means that the ratio of the amplitude therein of the vibrations to be received to the amplitude therein of the vibrations resulting from said abrupt or impulsive electrical forces is large.

4. An electromagnetic-wave receiving-system comprising in combination means for converting abrupt or impulsive electrical forces into spatialized periodic vibrations of predetermined frequency and for spatializing electrical vibrations created in said system by the electromagnetic waves the energy of which is to be received, said means having a plurality of degrees of freedom and a fundamental natural period different from that of said waves, an oscillation detector, a slow-speed circuit, means electrically associating said slow-speed circuit with said means, and means electrically associating said detector with said slow-speed circuit.

5. An electromagnetic-wave receiving-system comprising in combination an aerial, means for converting abrupt or impulsive electrical forces into periodic vibrations of predetermined frequency, said means having its most pronounced natural rate of vibration different from that of the waves the energy of which is to be received, an oscillation detector, and a conducting member so electrically associating said detector with said means that the ratio of the amplitude therein of the vibrations to be received to the amplitude therein of the vibrations resulting from said abrupt or impulsive electrical forces is large.

6. An electromagnetic-wave receiving-system comprising in combination means for converting abrupt or impulsive electrical forces into periodic vibrations of predetermined frequency, said means having a plurality of degrees of freedom and its most pronounced natural rate of vibration different from that of the waves the energy of which is to be received, an oscillation detector, and a conducting member so electrically associating said detector with said means that the ratio of the amplitude therein of the vibrations to be received to the amplitude therein of the vibrations resulting from said abrupt or impulsive electrical forces is large.

7. An electromagnetic-wave receiving-system comprising in combination means for converting abrupt or impulsive electrical forces into periodic vibrations of predetermined frequency, said means having its most pronounced natural rate of vibration different from that of the waves the energy of which is to be received, an oscillation detector, means for spatializing the said periodic vibrations resulting from said abrupt or impulsive electrical forces and for spatializing the electrical vibrations created in said system by the electromagnetic waves the energy of which is to be received, and means so electrically associating said detector with the last mentioned means that the ratio of the amplitude therein of the vibrations to be received to the amplitude therein of the vibrations resulting from said abrupt or impulsive electrical forces is large.

8. An electromagnetic-wave receiving-system comprising in combination means for converting abrupt or impulsive electrical forces into periodic vibrations of predetermined frequency, said means having a plurality of degrees of freedom and its most pronounced natural rate of vibration different from that of the waves the energy of which is to be received, an oscillation detector, means for spatializing the said periodic vibrations resulting from said abrupt or impulsive electrical forces and for spatializing the electrical vibrations created in said system by the electromagnetic waves the energy of which is to be received, and means so electrically associating said detector with the last mentioned means that the ratio of the amplitude therein of the vibrations to be received to the amplitude therein of the vibrations resulting from said abrupt or impulsive electrical forces is large.

9. An electromagnetic-wave receiving-system comprising in combination means for converting abrupt or impulsive electrical forces into spatialized periodic vibrations of predetermined frequency and for spatializing electrical vibrations created in said system by waves the energy of which is to be received, said means having a plurality of degrees of freedom and a fundamental natural period different from that of said waves, an oscillation detector, a slow-speed circuit, means electrically associating said slow-speed circuit with said means at a point where the amplitude of the vibrations to be received is substantially larger than the amplitude of the vibrations resulting from said abrupt or impulsive electrical forces, and means electrically associating said detector with said slow-speed circuit at a point where the amplitude in said slow-speed circuit of the vibrations to be received is substantially larger than the amplitude therein of the vibrations resulting from said abrupt or impulsive electrical forces.

10. An electromagnetic-wave receiving-system comprising in combination means for converting abrupt or impulsive electrical forces into periodic vibrations of predetermined frequency, said means having its most pronounced natural rate of vibration different from that of the waves the energy of which is to be received, an oscillation detector, means for spatializing the said periodic vibrations resulting from said abrupt or impulsive electrical forces and for spatializing the electrical vibrations created in said system by the electromagnetic waves the energy of which is to be received, and means electrically associating said detector with the last mentioned means at points where the resultant amplitude of the vibrations to be received is substantially larger than the resultant amplitude of the vibrations resulting from said abrupt or impulsive electrical forces.

11. An electromagnetic-wave receiving-system comprising in combination means for converting abrupt or impulsive electrical forces into periodic vibrations of predetermined frequency, said means having a plurality of degrees of freedom and its most pronounced natural rate of vibration different from that of the waves the energy of which is to be received, an oscillation detector, means for spatializing the said periodic vibrations resulting from said abrupt or impulsive electrical forces and for spatializing the electrical vibrations created in said system by the electromagnetic waves the energy of which is to be received, and means electrically associating said detector with the last mentioned means at points where the resultant amplitude of the vibrations to be received is substantially larger than the resultant amplitude of the vibrations resulting from said abrupt or impulsive electrical forces.

12. An electromagnetic-wave receiving-system comprising in combination means for converting abrupt or impulsive electrical forces into periodic vibrations of predetermined frequency, said means consisting of a closed toroidal coil, three primary windings inductively associated with said coil and located at points one hundred and twenty geometrical degrees apart, an antenna associated with said primary windings, an oscillation detector, and a conducting member so electrically associating said detector with said coil that the ratio of the amplitude therein of the vibrations to be received to the amplitude therein of the vibrations resulting from said abrupt or impulsive electrical forces is large.

13. An electromagnetic-wave receiving-system comprising in combination means for converting abrupt or impulsive electrical forces into periodic vibrations of predetermined frequency, said means consisting of a closed toroidal coil, three primary windings inductively associated with said coil and located at points one hundred and twenty geometrical degrees apart, said windings being connected in parallel, an antenna connected to a point common to said windings, an oscillation detector, and a conducting member so electrically associating said detector with said coil that the ratio of the amplitude therein of the vibrations to be received to the amplitude therein of the vibrations resulting from said abrupt or impulsive electrical forces is large.

14. An electromagnetic-wave receiving-system comprising in combination means for converting abrupt or impulsive electrical forces into periodic vibrations of predetermined ferquency, said means consisting of a closed toroidal coil, three primary windings inductively associated with said coils and located at points one hundred and twenty geometrical degrees apart, an antenna associated with said primary windings, an oscillation detector and means so inductively associating said detector with said coil that the ratio of the amplitude therein of the vibrations to be received to the amplitude therein of the vibrations resulting from said abrupt or impulsive electrical forces is large.

15. An electromagnetic-wave receiving-system comprising in combination means for converting abrupt or impulsive electrical forces into spatialized periodic vibrations of predetermined frequency and for spatializing electrical vibrations created in said system by electromagnetic waves the energy of which is to be received, said means having a plurality of degrees of freedom and a fundamental natural period different from that of said waves, an oscillation detector and a conducting member electrically associating said detector with said means, said conducting member being inductively associated with said means at a point where the amplitude of the vibrations to be received is substantially larger than the amplitude of the vibrations resulting from said abrupt or impulsive electrical forces.

16. An electromagnetic-wave receiving-system comprising in combination means for converting abrupt or impulsive electrical forces into spatialized periodic vibrations of predetermined frequency and for spatializing electrical vibrations created in said system by the electromagnetic waves the energy of which is to be received, said means having a plurality of degrees of freedom and a fundamental natural period different from that of said waves, an oscillation detector, a slow-speed circuit, means inductively associating said slow-speed circuit with said means and means electrically associating said detector with said slow-speed circuit.

17. An electromagnetic-wave receiving-system comprising in combination means for converting abrupt or impulsive electrical forces into spatialized periodic vibrations of predetermined frequency and for spatializing electrical vibrations created in said system by the electromagnetic waves the energy of which is to be received, said means consisting of a slow-speed circuit having its fundamental different from the frequency of said waves, an oscillation detector, a second slow-speed circuit, means electrically associating the said slow-speed circuits, and means electrically associating said detector with said second slow-speed circuit.

18. An electromagnetic-wave receiving-system comprising in combination means for converting abrupt or impulsive electrical forces into periodic vibrations of predetermined frequency, said means having two natural rates of vibration, one being the frequency of the waves the energy of which is to be received and the other being the frequency developed therein by abrupt or impulsive electrical forces, the latter being its most pronounced natural rate of vibration and different from that of the waves the energy of which is to be received, an oscillation detector, a slow-speed circuit, said slow-speed circuit having two natural rates of vibration corresponding, respectively, to the two natural rates of vibration of said means, means electrically associating said slow-speed circuit with said means, and means electrically associating said detector with said slow-speed circuit.

In testimony whereof, I have hereunto subscribed my name this 3rd day of October, 1921.

OSCAR C. ROOS.